(No Model.) 8 Sheets—Sheet 1.
C. WHITNEY & W. W. MARSH.
GRAIN BINDING HARVESTER.
No. 291,452. Patented Jan. 1, 1884.
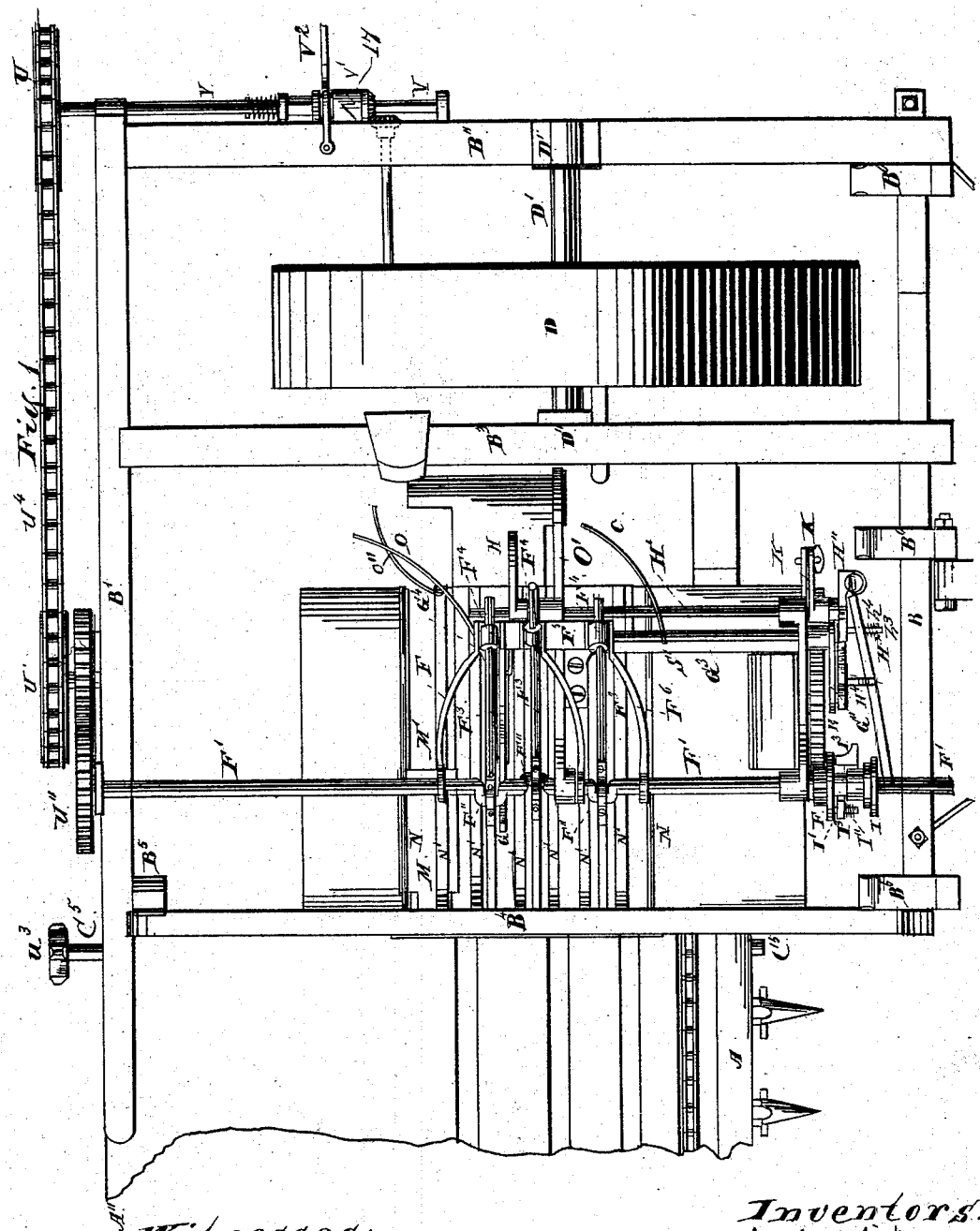
Witnesses:
Albert H. Adams.
Edgar T. Bond
Inventors:
Charles Whitney
William W. Marsh
By West & Bond
attys

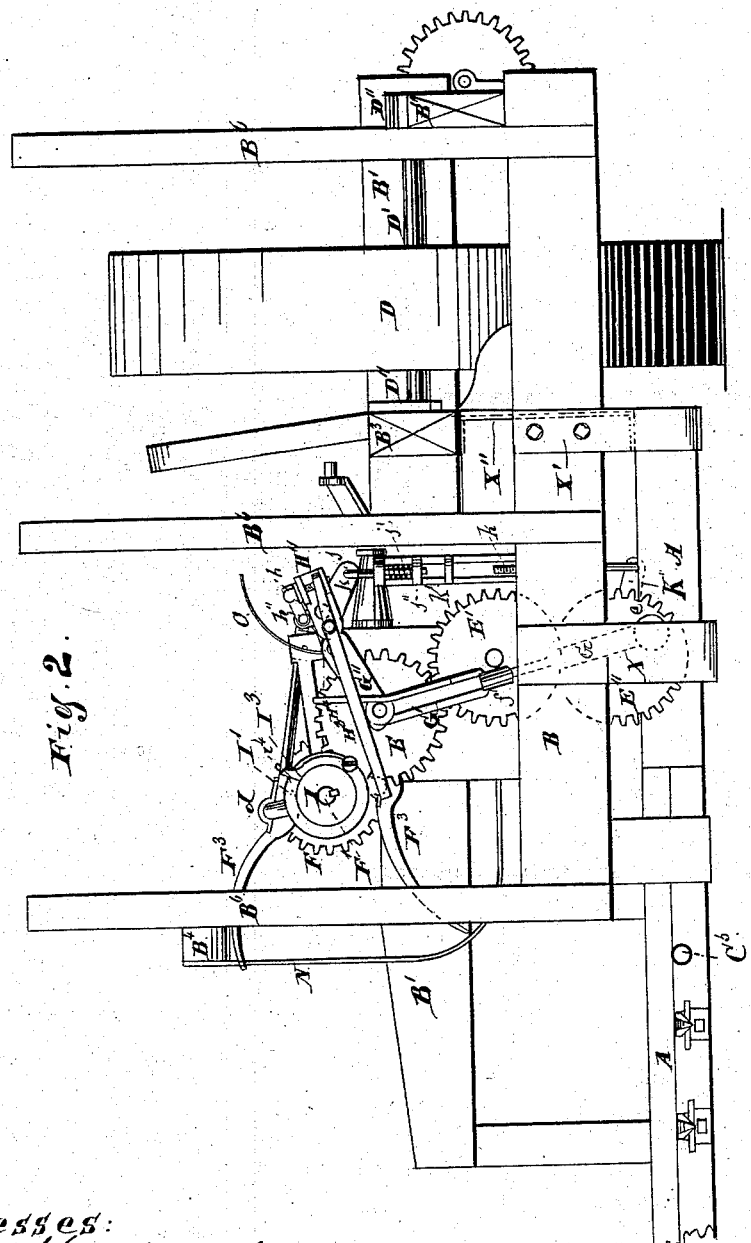

(No Model.) 8 Sheets—Sheet 3.
C. WHITNEY & W. W. MARSH.
GRAIN BINDING HARVESTER.
No. 291,452. Patented Jan. 1, 1884.
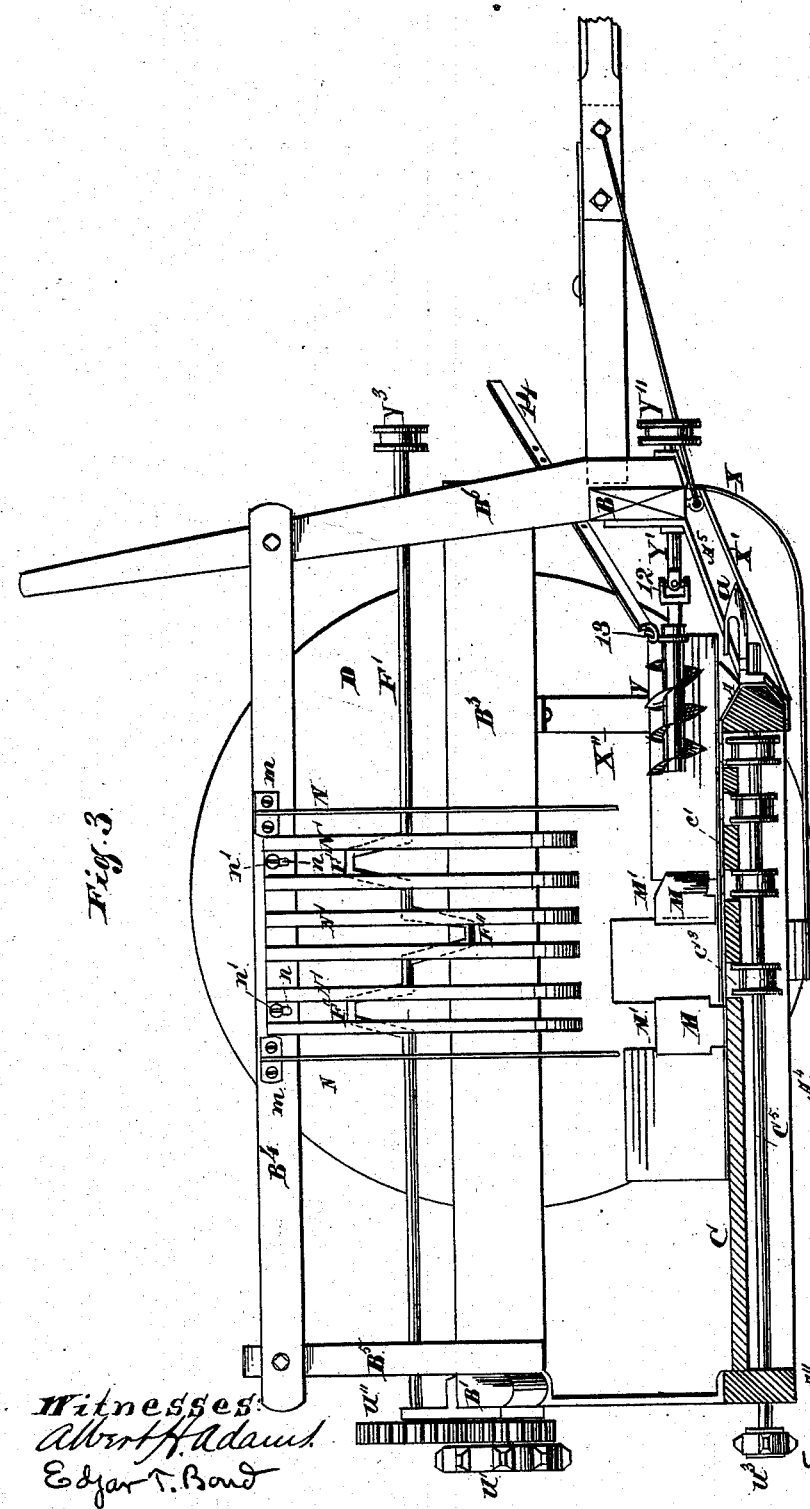

(No Model.) 8 Sheets—Sheet 4.
C. WHITNEY & W. W. MARSH.
GRAIN BINDING HARVESTER.
No. 291,452. Patented Jan. 1, 1884.
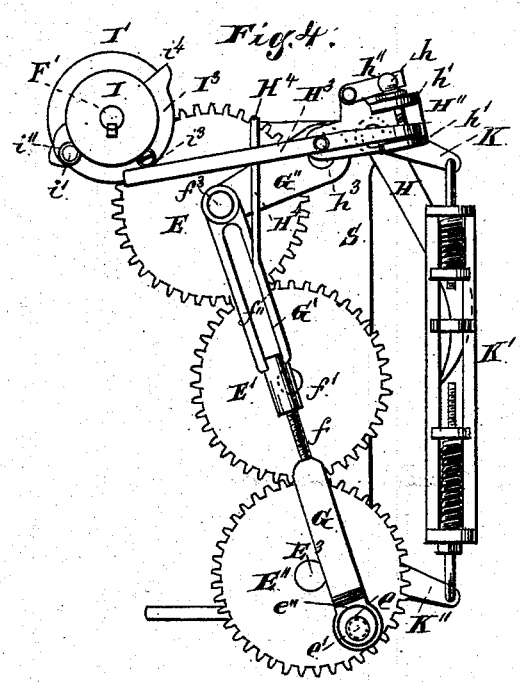
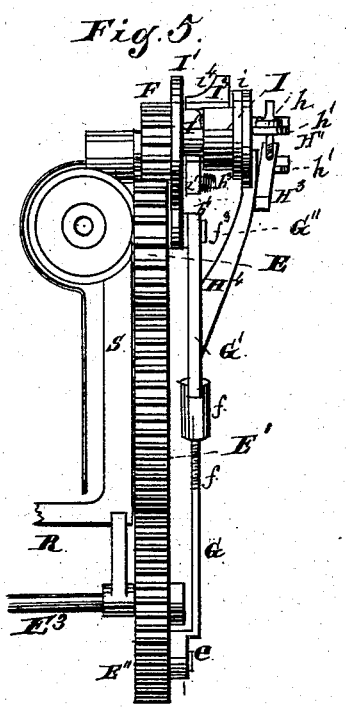
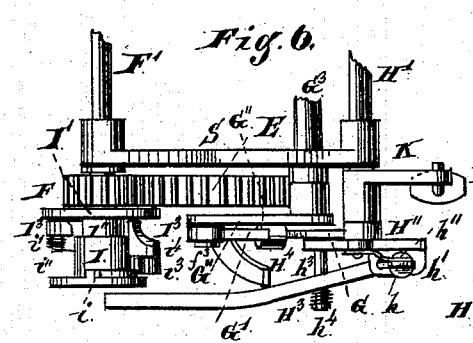
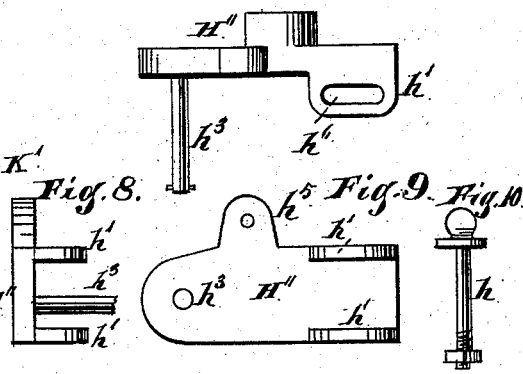
Witnesses:
Albert H. Adams
Edgar J. Bond
Inventors:
Charles Whitney
William W. Marsh
By West & Bond
Attys

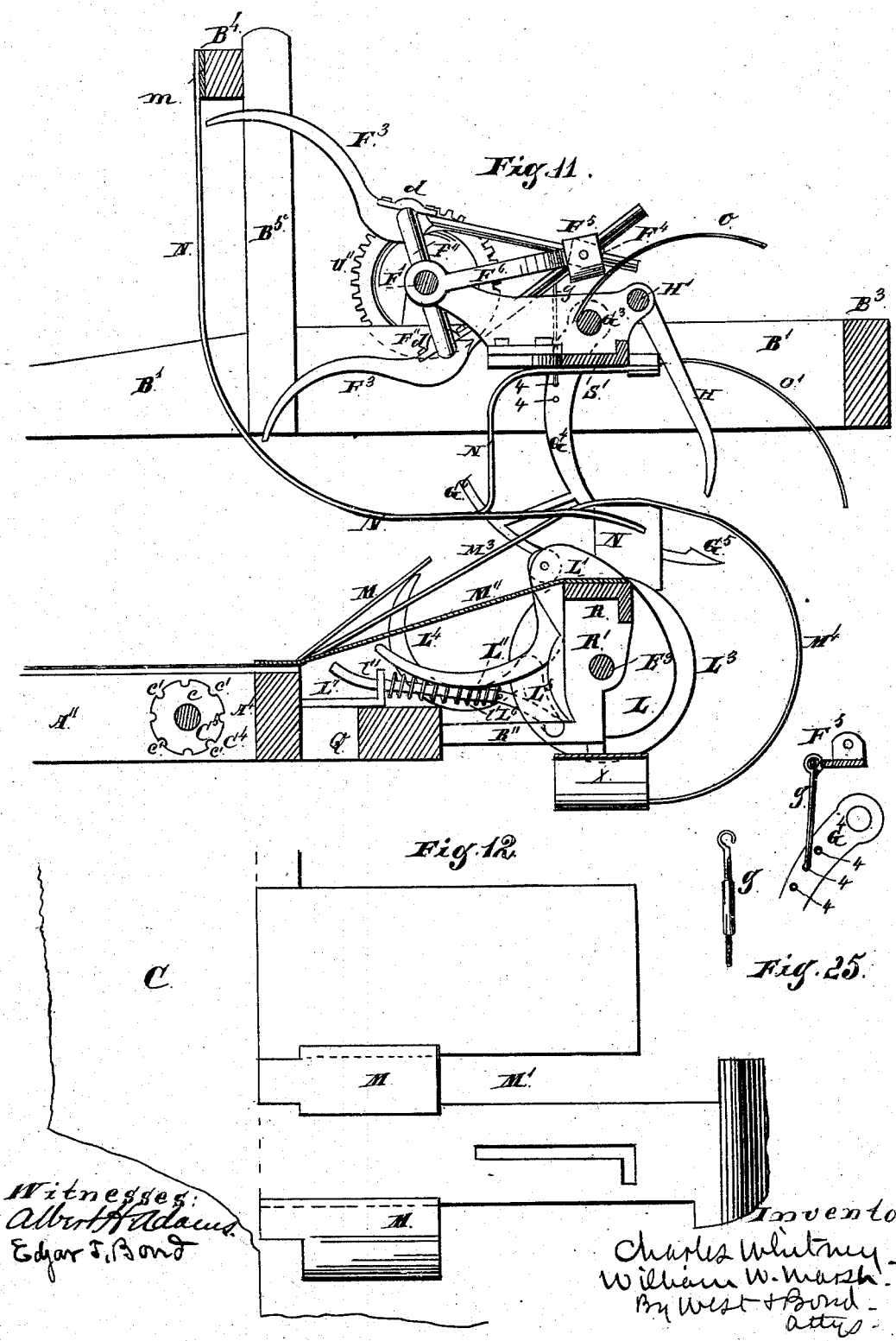

(No Model.) 8 Sheets—Sheet 6.
C. WHITNEY & W. W. MARSH.
GRAIN BINDING HARVESTER.
No. 291,452. Patented Jan. 1, 1884.
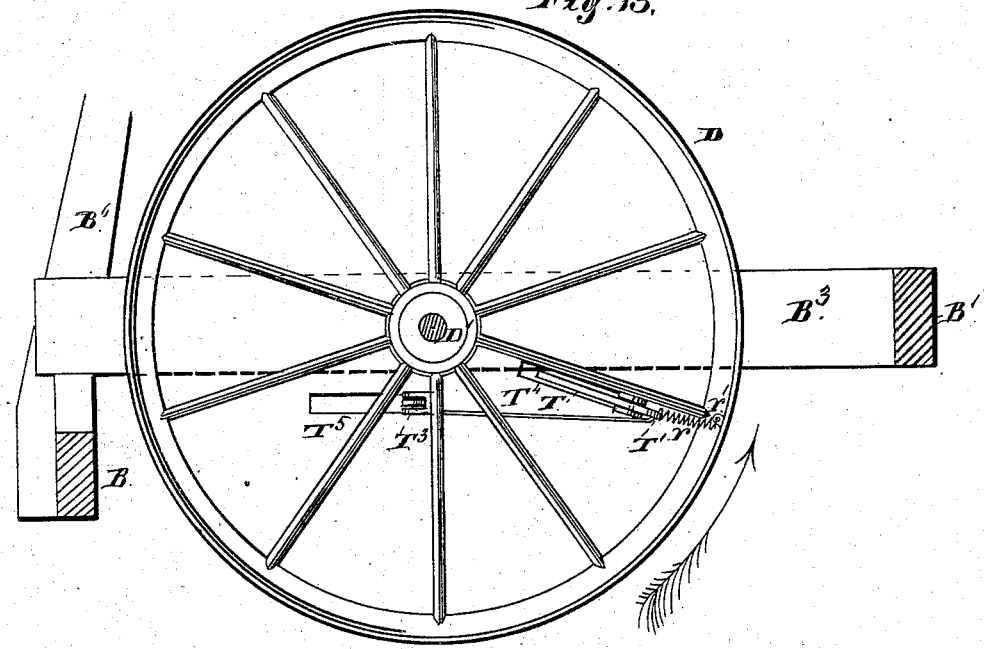
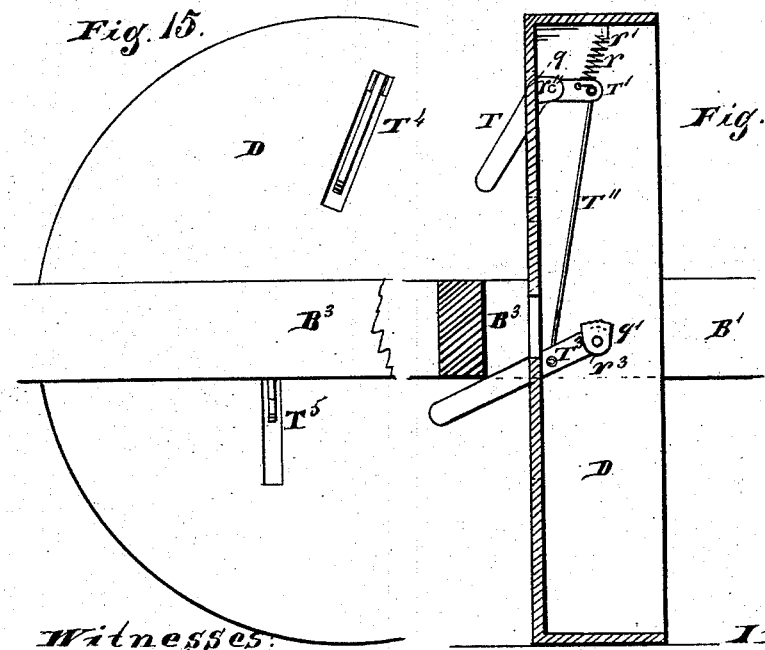
Witnesses:
Albert H. Adams
Edgar T. Bond
Inventors:
Charles Whitney
William W. Marsh
By West & Bond
atty

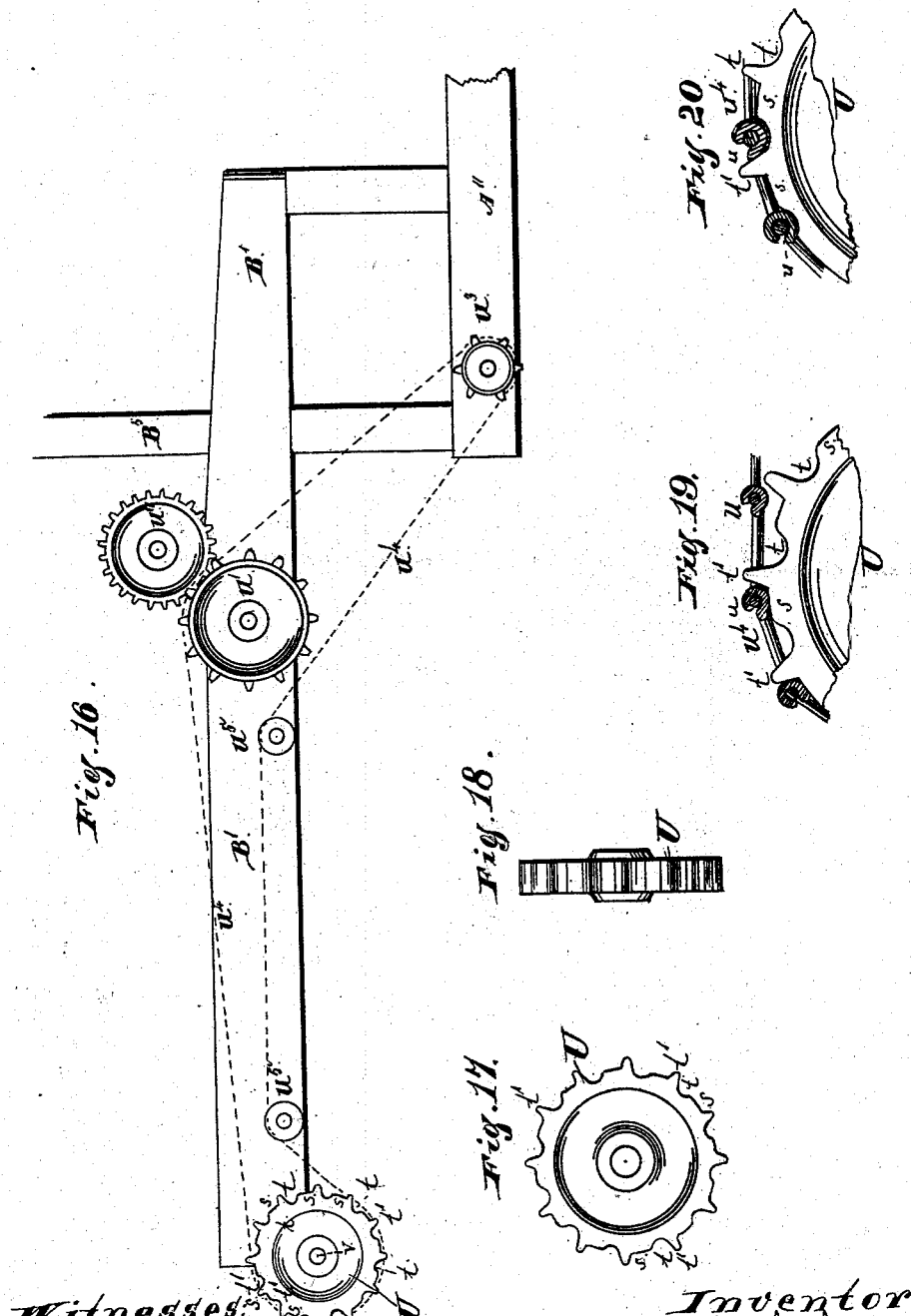

(No Model.) 8 Sheets—Sheet 8.
C. WHITNEY & W. W. MARSH.
GRAIN BINDING HARVESTER.
No. 291,452. Patented Jan. 1, 1884.
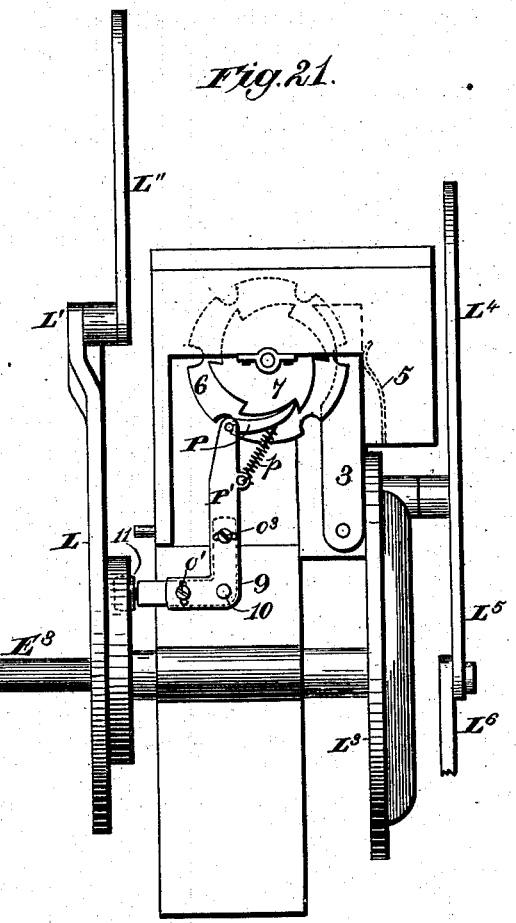
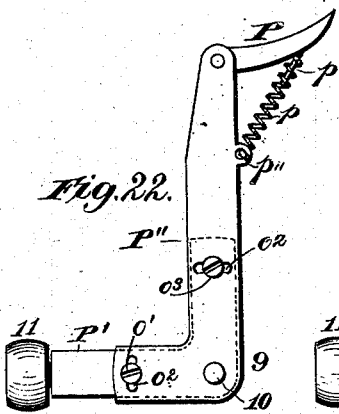
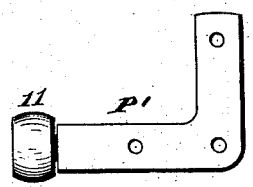
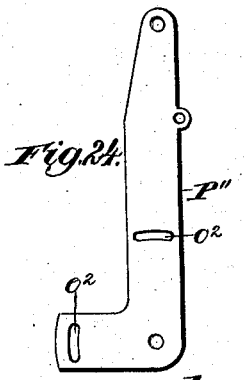
Witnesses.
Robert Everett
A. H. Norris.
Inventors.
Charles Whitney
and William W. Marsh.
By West & Bond
Attys

UNITED STATES PATENT OFFICE.

CHARLES WHITNEY AND WILLIAM W. MARSH, OF SYCAMORE, ILLINOIS.

GRAIN-BINDING HARVESTER.

SPECIFICATION forming part of Letters Patent No. 291,452, dated January 1, 1884.

Application filed June 19, 1882. (No model.) Patented in England May 6, 1880, No. 530, December 7, 1880, No. 5,088, and May 3, 1881, No. 1,920.

*To all whom it may concern:*

Be it known that we, CHARLES WHITNEY and WILLIAM W. MARSH, citizens of the United States, and residing at Sycamore, in the county of De Kalb, State of Illinois, have invented certain new and useful Improvements in Grain-Binding Harvesters, of which the following is a full, clear, and exact description.

This invention relates to that class of grain-binding harvesters in which the grain is bound as delivered from the receiving-platform without being elevated above the main or driving wheel, and in which a cord is used for binding the gavel; but the mechanisms for binding and manipulating the grain are applicable to other forms of harvesters.

The invention will be first described in detail, and the improvements afterward pointed out in the appended claims, a preliminary explanation being therefore deemed unnecessary.

In the accompanying drawings, which illustrate our invention, Figure 1 represents a top or plan view of the machine, with the grain-carrier platform broken away; Fig. 2, a front elevation with the tongue removed and the grain-carrier platform broken away; Fig. 3, a side elevation with the binding mechanism removed and the grain-carrier platform in section; Fig. 4, a detail view showing a front elevation of the gearing and devices operating the binding and bundle-discharging mechanism, also showing the trip devices for automatically sizing the bundle; Fig. 5, an edge view of the parts shown in Fig. 4; Fig. 6, a top or plan view of the same; Figs. 7, 8, and 9, views of the head or frame supporting the trip lever or finger; Fig. 10, a view showing the adjusting-screw for the trip-lever or finger; Fig. 11, a detail view in section, showing the devices for manipulating the grain; Fig. 12, a top or plan view of the platform for the grain and the shields for preventing the discharging-fingers from engaging with the unbound grain; Fig. 13, a side elevation of the outer face of main drive-wheel; Fig. 14, a sectional view of the same, showing the finger for assisting in the discharge of the bundle; Fig. 15, an inside broken view of the main drive-wheel, showing the bundle-discharging finger and its operating devices in the position shown in Fig. 14; Fig. 16, a rear elevation with the binding and other devices removed to show a portion of the frame, the main drive-chain, and the sprocket-wheels therefor; Figs. 17 and 18, side and edge views, respectively, of the changeable sprocket or chain wheel. Figs. 19 and 20 are enlarged views of the changeable sprocket-wheel with the chain in its two positions when driven by the wheel and when driving the wheel; Fig. 21, a detail showing the discharging-finger, disks, cord-holder, and the pawl or dog for operating the holder; Fig. 22, a detached enlarged view of the pawl or dog for operating the cord-holder; Figs. 23 and 24, detached views of two of the parts forming the pawl or dog; Fig. 25, a detail view showing the means for adjusting the packer-fingers to vary their stroke.

The finger-beam A may be of wood or metal, or the two combined, and, in connection with the rear sill A'', and the usual outer and inner sills or girts, constitutes the frame-work in which is arranged the grain receiving and conveying platform.

It will be understood that the machine will be provided with a suitable cutting apparatus, reel, and such other appliances as are requisite in working machines of this character, such features not being fully illustrated, as their construction and use are well known.

The front end sill, B, rear end sill, B', and cross sills or girts B'' and $B^3$ are all suitably connected and supported, the cross sills or girts being so arranged as to provide a space between them for the main or drive wheel D, which is supported by an axle, D', having its ends arranged in journal-boxes D''. An upper cross-girt, $B^4$, secured to the reel-post $B^6$ at the front and standard $B^5$ at the rear, serves for the attachment of the fender-bars N' and guide-rods N, employed to guide and direct the grain to the binding mechanism, such fender-bars and guide-rods, in connection with the binding-platform, constituting a grain-receptacle into which the grain, to form a gavel, is advanced and packed by the packing mechanism, as will be hereinafter explained.

The gear-wheels E, E', and E'' all mesh with one another, as clearly seen in Fig. 4, the first-mentioned wheel being rotated by a pinion, F, on the shaft F', which carries and actuates the packer-fingers, and thereby transmits motion to the wheels E' and E'', the latter being secured to and rotating a shaft, $E^3$, which actuates the bundle-discharging fingers and the cord-holding device, as hereinafter explained.

The packer-finger shaft F' is provided with three cranks, F'', on which the packer-fingers are loosely mounted through the medium of half-boxes d, and by means of which cranks the fingers are operated. The forward crank is so located and arranged as to bring the forward packer-finger into such position as to act on the butt-ends of the grain and force the same into the grain-receptacle of the binder. The acting portions of the packer-fingers are curved, as usual, and they are so actuated by the cranks that such curved portions enter the grain and are carried downward and inward to force the grain into the binding-receptacle. The upper ends of the fingers are arranged to reciprocate in guides or sockets $F^4$, which are pivoted to a bail or yoke composed of a cross-piece, $F^5$, and arms $F^6$, loosely hung on the crank-shaft F' in such manner that the packer-fingers can perform the requisite movements and yet be accurately guided and supported. The yoke or bail, being pivoted on the crank-shaft, is capable of being swung on its axis, and by such swinging movement the packer-fingers are carried into or out of the grain, according to the direction in which the yoke or bail is moved. If the bail be swung downward, the acting portions of the packer-fingers will be elevated out of the grain, while, if the bail be raised, the acting portions of the fingers will be lowered into the grain.

The binder-arm $G^4$ is fixed to the rear end of a short shaft, $G^3$, which is supported in suitable bearings on the binder-frame, the forward end of said shaft having an attached crank or arm, G'', which is connected with the wheel E'', so that the latter serves to actuate the binder-arm. The connection between the crank or arm and the wheel is made by a pitman composed of two sections, G G', the section G having at its lower end an opening to receive an eccentric ring, e, sleeved on a wrist-pin, e', on the face of the wheel, the upper end of said section having a screw-threaded stem, f, engaging a screw-threaded socket, f', on the lower end of the section G', the upper end of the latter connecting with a stud, $f^3$, on the crank or arm G''. The binding-arm may be of any desired construction, preferably having its body portion curved and terminating at its end in a point, $G^5$, and having formed upon it an extension or guard, $G^6$, which, as the arm passes through the grain, acts as a separator to divide the grain forming the gavel from the inflowing grain. The binder-arm is so attached to its shaft as to travel in the space between the rear and central packer-fingers, and it is connected with the cross-piece $F^5$ of the bail or yoke by a rod or link, g, the object of which is to swing the bail or yoke in the manner hereinbefore stated, for the purpose of lifting or carrying the packer-fingers out of the grain at stated intervals. Thus when the binder-arm descends to bind the gavel the bail or yoke, through the link or rod g, will be swung downward, thereby lifting or carrying the acting portions of the packer-fingers out of the grain, while, when the binder-arm rises, the yoke or bail will be raised, thus depressing the packer-fingers and causing them to enter and act on the grain to form another gavel. During such alternate rising and falling movements of the packer-fingers they are continuously actuated by the crank-shaft which carries them. The arrangement is such that the packer-fingers are caused to act on the grain when the latter is to be forced into the grain-receptacle, while a previously-formed gavel is being bound, which is of considerable importance in effecting a proper separation of the gavel from the inflowing grain, the latter being left at the throat of the grain-receptacle until the binding operation is complete and the packer-fingers carried back into the grain. It will of course be evident that the bail or yoke could be connected with some vibrating part of the binding mechanism other than the binder-arm, and accomplish the object above stated.

The connecting link or rod g between the bail or yoke and the binding-arm or other vibrating part of the machine is so arranged that it can be adjusted for the purpose of changing the operative position of the packer-fingers, thereby bringing them nearer to or farther from the tripping compressor-finger, to regulate the size of the gavel, as will hereinafter appear. The adjustability of the connection can be made in various ways; but, as here shown, the binder-arm is provided with a series of holes 4, (see Figs. 11 and 25,) and the lower end of the link or rod g is provided with a hook or bent end to engage any one of said holes; but in lieu thereof the link or rod may be made in the form of a turn-buckle (see Fig. 25)—that is, in two parts connected by a screw-threaded sleeve. The adjustability of the connection enables the packer-fingers to have the points at which they enter and leave the inflowing grain adjusted in such manner that they can be made to operate properly under all circumstances. By lengthening the connection between the binder-arm and the bail or yoke, the points at which the packer-fingers enter and leave the grain will be moved toward the tripping-compressor, and by shortening such connection the points at which the fingers enter and leave the grain will be moved from the tripping-compressor, thus varying the operative position of the packer, so that they can be made to enter the grain to a greater or less degree, as may be required, to cause them to pack more or less grain into the grain-receptacle to form a gavel; hence the size of the gavel can be regulated as occasion requires.

As before stated, the adjustment of the connection for varying the stroke of the packer-fingers can be effected in various ways. As shown in Figs. 11 and 25, if the rod or link g be engaged with the lower hole, 4, of the binder-arm, the connection is lengthened. The packer-fingers will be raised; but as the binder-arm rises the fingers will be thrown in toward the compressor-finger or farther into the receptacle, thus making a smaller gavel by causing a quick trip of the bundle-sizing mechanism, as hereinafter explained. The throw of the vibrating binder-arm is regulated by adjusting the length of the pitman which connects the binder-arm shaft with the wheel E'', which adjustment is readily effected by screwing the stem $f$ until the pitman is brought to the length desired. By lengthening the pitman, the limit to the downward throw of the binder-arm is lessened, while by shortening the pitman the limit to the downward throw is increased. When the binder-arm reaches the limit of its downward throw, the crank of the binder-arm shaft is at or near its full throw, while the adjustable wrist on the wheel E'' is at or near its dead-center, and when the binder-arm reaches the limit of its upward throw the crank on the binder-arm shaft and the wrist on the wheel E'' are both at or near their dead-centers, it being understood that the crank on the binder-arm shaft is longer than the crank on the wheel E''. Now, just so much as the throw of the binder-arm downward is increased by shortening the pitman its upward throw is decreased; but it is necessary that the arm in its upward throw should stand in the position it was before shortening the pitman, and this result is obtained by the eccentric ring $e$ on the wrist-pin $e'$, such eccentric ring being capable of rotary adjustment for the purpose of increasing or decreasing the length of crank formed by the wheel and its wrist-pin. The eccentric ring is attached to the wrist-pin by a set-screw, keying, or otherwise fastening it, so that it can be turned to bring its widest part to any desired position for the required adjustment, and when the adjustment is reached permit the ring to be locked to the wrist-pin to have the two virtually form a single piece. If the pitman has been shortened to cause the binder-arm to pass clear through the grain in its downward throw, we will then rotate the eccentric ring $e$ so that its broader or eccentric portion $e''$ will be brought around to stand near to the periphery of the wheel E'', or away from the axis $E^3$ of the wheel, thereby increasing the throw of the wrist-pin $e'$ by increasing the length of crank between the center of the wheel E'' and the center of the wrist-pin and eccentric. A very limited increase of throw in the wrist-pin is required to accomplish the object stated, and such increase of throw affects the downward throw of the binder-arm but slightly, and not to any appreciable extent, owing to the fact that when the binder-arm is lowest the crank or arm will stand at its full throw in a downward direction, with the pitman at the point farthest away, or nearly so, from a dead-center.

It will be obvious that the throw of the wrist-pin could be changed by constructing the wheel with a radial slot and rendering the wrist-pin adjustable in the slot or otherwise movable toward and from the axis or shaft $E^3$ of the wheel, thus accomplishing the same object as the adjustable eccentric ring. The same devices can be applied at either end of the pitman, and yet accomplish the desired object—namely, to raise the binder-arm clear of the inflowing grain.

H indicates a tripping compressor-finger, secured to a short shaft, H', arranged in bearings on the binder-frame, such finger coacting with the binder-arm to compress the gavel, and also serving as a means for actuating the clutch trip-lever $H^3$, which releases the clutch to automatically start the binder. This clutch trip-lever is supported as we will now explain.

To the outer end of the shaft H' is attached a frame or support, H'', Figs. 7, 8, and 9, composed of a plate having a hub to secure it to the shaft, and with ears $h'\ h'$ at its edges, having slots $h^6$ for the passage of a bolt or screw, $h$. To the end of the plate is secured a stud or pin, $h^3$, on which is pivoted the clutch trip-lever $H^3$, so that the latter can swing to cause its free end to engage or disengage a clutch-dog. The clutch-tripping lever is held in position by a coiled spring, $h^4$, on the stud or pin $h^3$. (See Fig. 6.) The outer end of the clutch trip-lever is provided with a screw-threaded opening to receive the bolt or screw $h$, which serves as a connection between the clutch trip-lever and the frame or support H''. The lever is held out of engagement with the clutch by a guide-bar, $H^4$, attached to but projecting above the upper section, G', of the pitman, and curved or bent so as to impart to the inner or free end of the clutch trip-lever an outward movement to hold it disengaged while the binding operation is being performed. The inner end of the clutch trip-lever can be caused to engage with the clutch-dog $I^3$, to a greater or less extent, through the medium of the bolt or screw $h$, by turning which the outer end of the lever can be raised or lowered, to correspondingly raise or lower its opposite or inner end, the lowering of the inner end decreasing the bearing-surface of the lever on the dog, thereby requiring less pressure on the tripping compressor-finger H, to release the clutch trip-lever from the dog, while the raising of the inner end of the clutch trip-lever causes an increased bearing-contact between the dog and clutch trip-lever, thereby requiring an increased pressure on the tripping compressor-finger to release the clutch trip-lever. By this adjustment, to increase and decrease the contact between the dog and clutch trip-lever, a greater or less pressure, and consequently greater or less amount of grain, will be required to release the clutch trip-lever; hence there is here provided additional means by which the gavel is automatically sized as desired.

The clutch I is secured to the front end of the shaft F', and consists of a hub and a rim, on the inner face of which are ribs or projections $i$, to connect the clutch with the clutch-dog $I^3$, which latter connects with the pinion F. The shaft F' passes loosely through the said pinion and the hub I'', so as to freely revolve without imparting motion to the pinion and the hub I'', except when the clutch-dog I³ is connected with the clutch I, which latter revolves at all times with the shaft. The clutch-dog I³ is curved to correspond with the circle of the clutch, and it is pivoted at one end to a stud, $i'$, on the rim I', and is acted on by a coiled spring, $i''$, secured to the stud $i'$, so as to permit said dog to have a limited lateral play on the stud. The dog has a side projection to bear against the rim for steadying the same, and it also carries a roller, $i^3$, mounted on a stud and arranged to engage the ribs or projections $i$ on the rim of the clutch I, such roller allowing the clutch to revolve when the clutch-dog is unlocked, but engaging the ribs or projections $i$ with sufficient friction, when the dog is locked, to cause the clutch to impart rotary motion to the pinion F. The free end of the clutch-dog is provided with a broad plain face, $i^4$, with which the inner end of the clutch trip-lever H³ engages to hold the hub and rim I'' I' stationary, thus preventing the pinion F from rotating, but permitting the clutch I to rotate. The end faces of the clutch-dog and clutch trip-lever form the frictional contact-surfaces to automatically size the bundle, and by the bolt or screw $h$, as before stated, the end of the clutch trip-lever can be made to engage more or less with the face $i^4$ of the dog, so that when the grain packed into the binding-receptacle comes into contact with the tripping compressor-finger H the latter will be moved outward, causing the shaft H' to rock, and with it the frame or support H'', thereby depressing the inner or free end of the clutch trip-lever in such manner that when the pressure from the compacted grain is sufficient to throw the clutch trip-lever from its engagement with the face $i^4$ of the clutch-dog I³ the resistance to the rotation of the pinion F will be released and the clutch I, through ribs $i$, roller $i^3$, and the hub and flange I'' I', will revolve the wheel F, thereby transmitting motion to the gear-wheels E E' E'' to operate the binding devices. By making the clutch trip-lever adjustable in its range of contact with the clutch-dog and operating the lever by the pressure of the grain on a tripping compressor-finger the binding devices are automatically operated and the gavels sized. The clutch trip-lever is held out of engagement with the clutch-dog while the binding operation is being performed by means of the guide arm or bar H⁴, which moves with the pitman G G' and operates to move the clutch trip-lever laterally away from the clutch-dog and in opposition to the spring $h^4$, the latter serving to restore the clutch trip-lever to proper position to engage the clutch-dog after the finger is released by the rising movement of the arm or bar H⁴. A yielding link-connection, K', is provided between the crank or arm K on the tripping compressor-finger shaft H' and the crank or arm K'', which is pivoted to the frame and rocked by a cam-groove in the wheel E'' for the purpose of preventing damage in case of too strong resistance or failure of the parts to accurately operate; but such connection is embraced in our application for Letters Patent filed May 19, 1881, Serial No. 33,713, and therefore a more explicit description is not here essential.

To the shaft E³, beneath the binding-platform, are secured disks L L³, to which are pivoted bundle-discharging fingers L'' and L⁴, the former being pivoted to an extension, L', of the disk L, all in such manner that, as the disks are carried around, the fingers are free to turn or swing so that they can fold inward to free themselves from the gavel after it is discharged from the platform. The finger L⁴ has a rear angular extension, to which is pivoted a bar, L⁶, entering a slot in the end $l''$ of the plate L⁷, and encircled by a spring, $l'$, the latter affording the requisite resistance to hold the finger in position to discharge the gavel.

The construction and mode of operation of the bundle-discharging fingers are embraced in our application above mentioned, and a more definite description is not deemed necessary herein.

Where the slots M' are provided for the passage of the discharging-fingers through the binding-platform, we arrange shields M to prevent the fingers from engaging with the inflowing grain and carrying it forward with the bundle. These plates are preferably of metal that will spring upward by the action of the discharging-fingers rising through the slots M', and are attached at one end to the base of the binding-platform adjacent to the grain-carrier platform C, and they may be hinged or rigidly attached, as desired. These plates will not interfere with the proper working of the discharging-fingers, for the reason that they are free to yield or spring upward to permit the fingers to pass through the slots and engage a bundle for discharging the same from the binding-platform. The plates form guards or shields which hold the inflowing grain away from the discharging-fingers as the latter rise through the slots to discharge a bundle, as will be obvious by reference to Fig. 11.

The flexible or yielding guide-rods N, located outside the fender-bars N', are secured at their upper ends to the cross-girt B⁴ by means of metal plates $m$, or otherwise, and extend downward and over the binding-platform, Fig. 11, for the purpose of pressing downward upon the grain to steady the flow thereof and retain the grain in proper position to be bound. The fender-bars N' are attached to the cross-girt B⁴, so as to be adjustable, and, as here shown, the attachment is made by bolts $n'$, passing through slots in the plates $n$, to which the upper ends of the bars are secured. The bars extend downward and over the binding-platform, and are bent upward and secured at their rear ends to the binder-frame S'. By adjustably attaching the fender-bars N' to the cross-girt B⁴, the throat at the entrance to the grain-binding receptacle can be varied or made wide or narrow, to adapt the throat to thin or thick grain, such bars also acting in part to compress the grain in its passage through the throat to the grain-binding receptacle.

O O indicate downwardly-curved rods arranged on the binder-arm shaft, to form stays or retainers to support the ends of the grain while it is being packed into the binding-receptacle, and preventing such ends of the grain from flying or bending outward on each side of the compressor-arm, so that the grain is kept even and straight.

O' indicates a downwardly-curved guide-rod for directing the bundle and insuring its proper discharge by preventing it from being thrown upward by the action of the discharging-fingers.

O'' indicates a guide-rod connected with a part of the binder-frame and extending rearward and downward, for the purpose of engaging the head of the gavel to hold it down in such manner as to prevent the usual bundle-discharging fork (described and shown in our application before mentioned) from engaging with the head of the gavel and turning it around end to end, as is liable where some means is not provided to prevent the head of the bundle from rising if the butt be caught or hung from any cause.

In Figs. 21, 22, 23, and 24 we have shown a dog or pawl, P, for actuating the cord-holder, which latter may be of any well-known construction. As shown, it is composed of a pivoted plate, 3, acted on by a spring, 5, to throw it inward against the periphery of a notched wheel, 6, having secured to one of its faces a ratchet-wheel, 7, with which the pawl or dog P engages, to rotate it; but as the cord-holder is constructed and operates as in our application before mentioned, a more full explanation is not here essential, for the reason that the cord-holder may be of any suitable construction to be actuated by the pawl or dog. The pawl or dog P is pivoted to the end of a bell-crank lever, P'', and is held in engagement with the ratchet-wheel 7 by a spring, p, one end of which is secured to a pin, p', on the pawl, and the other end to an eye, p'', on the edge of the bell-crank lever, such spring allowing the dog to yield in passing by the teeth of the ratchet-wheel.

The bell-crank lever is composed of two angular plates, P' P'', secured one upon the other by screws or bolts o' o³, passing through slots o² in the plate P''. This lever is given the required movement by pivoting its angle 9, as at 10, and providing its end with a roller, 11, which operates in a cam-groove in the face of the disk L, and by constructing this lever of two sections, and uniting them by screws or bolts and slots, as described and shown, the angle at which the lever operates can be varied to take up any lost motion in the operation of the pawl or dog, so as to cause the same to rotate the ratchet-wheel at the proper time and to the exact extent required. The provision of an adjustable pawl or dog is of considerable importance, in that it enables a proper adjustment to be effected to cause the pawl or dog to accurately perform its functions, and by constructing the bell-crank lever of two angle-plates adjustably connected together, the adjustment of the lever is conveniently effected by simply loosening the screws or bolts o' o³, changing the relative positions of the two plates P' P'', and then tightening up the screws or bolts.

We do not confine ourselves to the specific devices described and shown for adjusting the pawl or dog, as other means can be employed for accomplishing the desired object—as, for example, the pawl or dog itself may be adjustable on its carrying bell-crank lever.

T indicates a finger, located in a slot, T⁴, in the face of the main drive-wheel D, such finger being pivoted between ears q by a pin or bolt, r'', and provided with an extension or arm, T', to which is attached one end of a coiled spring, r, the other end being attached to a stud, r', on the interior of the drive-wheel. The end or extension T' is pivotally connected to a rod or link, T'', the other end of which is pivotally connected to a lever, T³, as in Fig. 14. This lever is pivoted between ears q', attached to one of the spokes of the drive-wheel by a suitable pin or bolt, r³, and its forward end passes through the slot T⁵ in the wall of the drive-wheel. The wheel in its revolution carries with it the finger T and lever T³, and, as here shown, the lever is adapted to engage with the top and bottom of the cross-beam B³, which effects the operation of the finger; but the operation of the finger can be effected by means other than the cross-beam. As the lever strikes the top of the beam, the finger will be projected into such position as to strike the bundle in case it hangs from the binding-platform or other part of the machine from any cause whatever—such as straws catching and holding into any part of the machine—the finger serving to force the bundle rearward and effect its prompt discharge. The finger will be held projected so long as the lever is engaged with the side of the cross-piece B³; but when the lever leaves the edge of the cross-piece the finger will be folded into the slot by the action of the spring r, and at the same time the lever will be projected so as to strike the under face of the cross-piece, thereby again projecting the finger, but in a plane above the cross-piece, until the lever is folded in by the cross-piece and passes by the same, when the finger will be folded into its slot, so as to enable it to pass by the cross-piece and be again projected in the manner stated, to force any bundle rearward that may have become caught from any cause and failed to be properly discharged from the machine.

It sometimes occurs that the butt of the bundle is caught and held on the binding-platform or some other part of the machine, while the other end of the bundle falls to the ground and is dragged along. In such occurrences the folding finger T performs an important office, in that it strikes the bundle and forces it rearward, thereby compelling it to leave the machine. In Figs. 16 to 20, inclusive, we have illustrated our improved sprocket-wheel U, which is adapted to be driven by a chain. This wheel is the main driving-wheel for the chain by which movement is imparted to the binding devices and to the chains which carry the grain along the grain-receiving platform. The spaces between the teeth $t'$ of the sprocket-wheel are so constructed as to provide faces $s$ and $t$ on different planes, thus constituting what we define as two different diameters. The face $s$ is formed by the part of the wheel usually left between the teeth; but the face $t$ is formed by a notch or depression of such size as to receive the end bar, $u$, of the chain-link. If the sprocket-wheel is acting to drive the chain, the end bar, $u$, of the chain-link rests upon the face $s$ and bears against the back edge of the teeth $t'$, as in Fig. 19; but if the chain is operated to drive the sprocket-wheel, then the end bar, $u$, of the chain-link passes into the notch or depression forming the face $t$, and is acted upon by the front edges of the teeth $t'$, as in Fig. 20. In this manner a wheel is provided with one diameter to act as a driver, and another and smaller diameter to act as a driven wheel, such diameters having relation to the diameter of the sprocket-wheel $u'$, which drives the chain when the chain drives the wheel U, and vice versa. By this arrangement, when the machine is working from the main or drive-wheel, the sprocket-wheel, receiving its power therefrom, acts as a driver for the chain to operate the binding mechanism and the platform-chains; but in testing a machine to determine if all the parts operate in unison, it is essential to operate the binding mechanism from the wheel $u'$ by a hand-crank, and in this event the sprocket-wheel U will be the driven wheel. The sprocket-wheel $u'$ is provided at its rear face with a pinion which engages the gear-wheel $u''$ for rotating the crank-shaft F', while the sprocket-wheel $u^3$ serves to rotate the shaft $C^5$, which drives the platform-carrier chains, as will be obvious to those skilled in the art without further explanation.

The shaft V, Fig. 1, which carries the sprocket-wheel U at its rear end, is actuated by the main drive-wheel through the medium of suitable gearing, which serves to rotate the wheel 17, which is loose on the shaft. A sliding clutch, V', of any well-known construction, operated by a lever, $V^2$, or other suitable contrivance under control of the operator, and capable of sliding on, but rotating with, the shaft V, serves to engage and disengage the wheel 17. So long as the clutch and wheel are locked together, the shaft will be rotated; but when unlocked the wheel 17 is free to revolve on the shaft, thereby stopping the rotation of the latter. This lever is preferably so arranged that the driver can place his foot thereon and disengage the clutch, thereby stopping the rotation of the shaft V, and hence stopping the action of the binder and the grain-carrier chains. This places the machine entirely under control of the driver, who can stop the action of the binder and the flow of grain thereto at will, for the purpose of accumulating a sufficient amount of thin and scattering grain upon the platform to provide a steady and even flow of grain to the binder.

To the front beam, B, is secured one end of a metallic plate, X, Figs. 2 and 11, the other end being connected with the binder-frame at the lower portion of standard R', (see Fig. 11,) the object of which is to avoid injury to the gearing, should obstructions be met, such plate also preventing straw, &c., from entering the gearing and interrupting the prompt working of the parts. This plate operates as a fender or shield, and also subserves the function of bracing the binder-frame, by reason of its rearward extension being connected with such frame. (See Fig. 3.)

For the purpose of bracing and supporting the finger-beam A, we provide brace-bars X' X'', the bar X' being inclined and attached at one end to the front beam, B, and at its other end to the finger-beam, while the bar X'' is arranged vertically, one end being attached to the cross-beam $B^3$ and its other end to the finger-beam. Upon the binding-platform is located a wheel, Y, preferably in the form of a worm or screw, or other construction, connected at the front end to the longitudinally-sliding and rotating shaft Y' by means of a universal joint, 12, Fig. 3. Keyed upon the shaft Y is a pulley, Y'', the construction being such that while the pulley can rotate the shaft the latter is free to slide longitudinally, said pulley being driven by a pulley, $Y^3$, on the crank-shaft F', thereby transmitting a rotary motion to the screw or worm, whereby the butt-ends of the grain delivered to the binding-platform are so acted upon by the screw or worm as to direct and feed the grain upward and transversely into the binding-receptacle. The screw or worm is connected at one end by a joint, 13, to a lever, 14, which is pivoted to the front beam, B, so that the position of the screw or worm can be adjusted on the binding-platform to vary the angle at which it acts on the butt-ends of the grain. Various other ways, however, of adjusting the screw or worm on the platform will readily suggest themselves, and we do not, therefore, confine ourselves to the specific means shown. The screw or worm will usually stand in an oblique position on the binding-platform, so that it will operate to direct the grain both upward and rearward into the binding-receptacle; and to accommodate the device to long or short grain, the shaft Y' will be adjusted longitudinally, which can be conveniently effected by swinging the lever 14 on a pivotal bearing, which connects it to the front beam, B.

In our application for Letters Patent hereinbefore referred to we have described and claimed the continuously-operating packer-fingers connected with a vibrating part of the binding mechanism for carrying the fingers out of the grain when the binder-arm descends to bind a gavel. Therefore we do not herein broadly claim such features.

Having thus described our invention, what we claim is—

1. The combination of the crank on the binder-arm shaft, the wheel E'', the adjustable wrist-pin on said wheel, and the extensible pitman connecting the wrist-pin with the crank on the binder-arm shaft, the whole for adjusting the throw of the binder-arm.

2. The combination of a clutch, a clutch-dog adapted to engage and disengage the same, a clutch trip-lever carried by the tripping compressor-finger shaft for locking the clutch-dog, and means for adjusting the clutch trip-lever to vary its contact with the clutch-dog, substantially as described.

3. The tripping compressor-finger shaft H' and frame H'', in combination with the clutch trip-lever H³, adjusting-screw $h$, clutch I, and clutch-dog I³, for automatically releasing the clutch by the pressure of the inflowing grain, and varying the size of the bundles, substantially as specified.

4. The clutch trip-lever H³, adapted to be operated from the pressure of the inflowing grain, and engaging a clutch, in combination with a guide arm or bar for holding the lever disengaged while the binding operation is being performed, substantially as specified.

5. The clutch trip-lever H³, engaging a clutch, and adapted to be operated from the inflowing grain, in combination with the guide arm or bar H⁴ on the pitman G and the pressure-spring $h^4$, substantially as and for the purposes specified.

6. The metal plates M, located at the base of the slot M', in combination with the discharging-fingers for preventing the point of the fingers engaging with the inflowing grain, substantially as and for the purposes specified.

7. The adjustable fender-bars N', in combination with the binding-platform for increasing or decreasing the throatway or passage for the inflowing grain to the binder, substantially as specified.

8. The curved rods or bars N and the adjustable fender-bars N', in combination with the binding-platform for the grain, for delivering the grain to the binder, substantially as specified.

9. A lever for operating the cord-holder, consisting of two angle-plates adjustably connected together for changing the throw of the dog and causing it to properly perform its work, substantially as described.

10. The folding finger located on the main or drive wheel and adapted to engage the bundle and move it backward, and means for operating the finger, substantially as specified.

11. The finger T, having an arm or extension, T', in combination with a spring and devices for throwing the finger out, substantially as and for the purposes specified.

12. The finger T, having an arm or extension, T', in combination with a spring, $r$, rod or link T'', and arm or lever T³, and operating mechanism for folding and projecting the finger, substantially as and for the purposes specified.

13. The finger T, in combination with the rod or link T'', arm or lever T³, and cross-beam B³, for projecting the finger to engage the butt-end of the bundle, substantially as and for the purpose specified.

14. A sprocket-wheel having two diameters, as described, in combination with a driving-chain, whereby the wheel is adapted for use either as a driver or driven wheel in operation, substantially as and for the purposes specified.

15. The sprocket-wheel U, having the faces $s$ and notches or depressions $t$, forming together two diameters on the same wheel, in combination with a drive-chain, and operative mechanisms for adapting either the wheel or the chain to act as the driver, substantially as and for the purposes specified.

16. The brace-bars X' X², in combination with the front beam, B, cross-beam B³, and front beam of the platform-frame, for forming a bracing and support for the finger-beam, substantially as specified.

17. In a grain-adjusting mechanism, a longitudinally-adjustable shaft, a worm wheel or screw connected with the rear end thereof, and located on the binding-platform, and means for adjusting the angle at which the wheel operates on the platform, substantially as described.

18. In a grain-adjusting mechanism, a shaft and a worm wheel or screw located on the grain receiving and binding platform, and connected with the shaft by a universal joint, whereby its angle relative to the shaft can be varied, substantially as described.

19. The combination of packer-fingers and an adjustable connection between them and the binder-arm, for causing them to enter and leave the grain and varying the operative position of the fingers, substantially as described.

20. The combination of continuously-operating packer-fingers, a binder-arm, and an adjustable connection between the fingers and the arm, whereby the stroke of the fingers may be varied and they are carried out of the grain as the binder-arm descends, substantially as described.

CHARLES WHITNEY.
WILLIAM W. MARSH.

Witnesses to the signature of Charles Whitney:

ALBERT H. ADAMS,
O. W. BOND.

Witnesses to the signature of William W. Marsh:

C. W. MARSH,
A. M. STARK.